(12) United States Patent
Zheng et al.

(10) Patent No.: US 10,923,019 B2
(45) Date of Patent: Feb. 16, 2021

(54) IRREGULAR DISPLAY PANEL AND DISPLAY DEVICE

(71) Applicant: XIAMEN TIANMA MICRO-ELECTRONICS CO., LTD., Xiamen (CN)

(72) Inventors: Binyi Zheng, Xiamen (CN); Yan Yang, Xiamen (CN); Yongping Zeng, Xiamen (CN); Ling Wu, Xiamen (CN); Poping Shen, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 158 days.

(21) Appl. No.: 16/119,810

(22) Filed: Aug. 31, 2018

(65) Prior Publication Data

US 2019/0088188 A1    Mar. 21, 2019

(30) Foreign Application Priority Data

Sep. 19, 2017    (CN) .......................... 201710848486.8

(51) Int. Cl.
 *G09G 3/20* (2006.01)
 *G02F 1/1337* (2006.01)
 *G02F 1/1333* (2006.01)

(52) U.S. Cl.
 CPC ..... *G09G 3/2074* (2013.01); *G02F 1/133707* (2013.01); *G09G 3/20* (2013.01);
 (Continued)

(58) Field of Classification Search
 None
 See application file for complete search history.

(56) References Cited

U.S. PATENT DOCUMENTS

2005/0127830 A1    6/2005   Heo et al.
2016/0120005 A1*   4/2016   Wu ...................... H05B 33/145
                                                              313/505

(Continued)

FOREIGN PATENT DOCUMENTS

CN        105514134 A      4/2016
CN        106019753 A     10/2016

(Continued)

OTHER PUBLICATIONS

CN First Office Action, Application No. 201710848486.8, dated Apr. 12, 2019.

*Primary Examiner* — Kent W Chang
*Assistant Examiner* — Benjamin Morales
(74) *Attorney, Agent, or Firm* — Alston & Bird LLP (57) ABSTRACT

An irregular display panel and a display device are provided. A display region has an irregular boundary. The display panel includes low-luminance pixels, and normal pixels arranged away from the irregular boundary. The pixel rows and/or the pixel columns include pixel groups each including a first pixel group and a second pixel group. The number of pixels adjacent to the irregular boundary in the first pixel group is greater than that in the second pixel group, and the number of low-luminance pixels of the first pixel group is greater than or equal to that of the second pixel group. The pixel includes at least three sub pixels each including an electrode having at least one slit. The total slit lengths of the low-luminance pixels in a same pixel group increase gradually in a direction from the irregular boundary to the display region.

16 Claims, 5 Drawing Sheets

(52) U.S. Cl.
CPC ............ *G02F 2001/133388* (2013.01); *G02F 2201/56* (2013.01); *G09G 2300/0421* (2013.01); *G09G 2300/0439* (2013.01); *G09G 2310/0232* (2013.01); *G09G 2320/0686* (2013.01)

(56) References Cited

U.S. PATENT DOCUMENTS

| | | | |
|---|---|---|---|
| 2016/0291376 A1 | 10/2016 | Iwatsu et al. | |
| 2017/0192313 A1 | 7/2017 | Long et al. | |
| 2017/0322446 A1* | 11/2017 | Tae | G02F 1/134309 |
| 2018/0012566 A1 | 1/2018 | Lin et al. | |
| 2019/0073968 A1* | 3/2019 | Tominaga | G09G 3/3607 |

FOREIGN PATENT DOCUMENTS

| | | | |
|---|---|---|---|
| CN | 107103893 A | 8/2017 |
| EP | 1533843 A2 | 5/2005 |
| JP | H0953955 A | 2/1997 |

\* cited by examiner

IRREGULAR DISPLAY PANEL AND DISPLAY DEVICE

CROSS REFERENCE TO RELATED APPLICATION

The present application claims priority to Chinese Patent Application No. CN201710848486.8, titled "IRREGULAR DISPLAY PANEL AND DISPLAY DEVICE", filed on Sep. 19, 2017 with the State Intellectual Property Office of People's Republic of China, which is incorporated herein by reference in its entirety.

FIELD

The present disclosure relates to the technical field of display, and particularly to an irregular display panel and a display device.

BACKGROUND

With increasing applications of display technology in intelligent wearable electronic devices and other portable electronic devices, there are various requirements for shapes of display panels, thereby developing irregular display panels.

A main difference of an irregular display panel from a regular display panel is that a display region of the irregular display panel is in a special shape such as a circle, a ring, a diamond, instead of a rectangle. However, pixel units in the display panel are almost in a rectangle shapes or other regular structures. Therefore, as the rectangular pixel units are applied to the irregular display panel, the pixel units cannot match with an irregular boundary of the display panel in a region near the irregular boundary of the display panel, which results in serrated edges displayed in a display region of the display panel near the irregular boundary. Therefore, the pattern in the boundary is unsmooth, affecting a display effect in the display region near the irregular boundary.

Therefore, it is desired to provide an irregular display panel and a display device, to suppress a serrated display in the irregular display panel.

SUMMARY

In view of this, an irregular display panel and a display device are provided in the present disclosure, to solve a technical problem of the serrated display in the irregular display panel.

In order to solve the above technical problem, an irregular display panel is provided in the present disclosure. A display region of the irregular display panel has an irregular boundary.

The irregular display panel includes multiple pixels, and the multiple pixels include low-luminance pixels and normal pixels. Luminance of the low-luminance pixels is less than luminance of the normal pixels under the same driving voltage. Multiple pixel rows extending in a first direction and multiple pixel columns extending in a second direction are formed by the multiple pixels. The pixel rows and/or the pixel columns include pixel groups. Each of the pixel groups includes one or more of the low-luminance pixels at an end of the pixel group and one or more of the normal pixels at the other end of the pixel group. The normal pixels are arranged away from the irregular boundary. The first direction interests with the second direction.

Each of the pixels includes at least three sub pixels, and each of the sub pixels includes an electrode. The electrode includes at least one slit. A total slit length of each of the pixels is a sum of lengths of all the slits of the at least three sub pixels in the pixel. The total slit lengths of the low-luminance pixels in a same pixel group increase gradually in a direction from the irregular boundary to the display region.

Furthermore, in order to solve the above technical problem, a display device is provided in the present disclosure, which includes any irregular display panel according to the present disclosure.

As compared with the conventional technology, the irregular display panel and the display device in the present disclosure can realize the following advantageous effects.

The irregular display panel in the present disclosure includes the low-luminance pixels and the normal pixels. The low-luminance pixels are arranged in the display region close to the irregular boundary. By regulating the sum of lengths of slits of electrodes in sub pixels, electric field intensities of the electrodes in the sub pixels are different after the same voltage is applied, to obtain different transmittance of the pixels. Luminance of the low-luminance pixels is less than luminance of the normal pixels, so as to suppress the serrated display at the irregular boundary. The luminance of the low-luminance pixels increases gradually in a direction from the irregular boundary to the display region, so that the luminance transits gradually from small to normal in the direction from the irregular boundary to the display region, and no large luminance difference occurs in the display region, thereby realizing a good display effect.

The exemplary embodiments of the present disclosure are described in detail below with reference to the drawings, so that other features and advantages of the present disclosure become clear.

BRIEF DESCRIPTION OF THE DRAWINGS

The drawings contained in the specification and forming a part of the specification show the embodiments of the present disclosure, to illustrate the principle of the present disclosure together with the description.

DETAILED DESCRIPTION OF THE EMBODIMENTS

Various exemplary embodiments of the present disclosure are described in detail with reference to the drawings. It should be noted that relative arrangement of components and steps, numeric expressions and values described in the embodiments are not intended to limit the scope of the present disclosure, unless otherwise stated.

The following description for at least one exemplary embodiment is only illustrative, and is not intended to limit the present disclosure or application or usage thereof.

The technology, the method and the device known by those skilled in the art may not be described in detail, but the technology, the method and the device should be regarded as a part of the specification when appropriate.

In all examples shown and described here, any specific value should be considered to be only exemplary, rather than restrictive. Therefore, a difference value may be used in other examples of the exemplary embodiment.

It should be noted that similar reference numbers and letters denote similar items in the following drawings. Therefore, once a certain item is defined in one of the drawings, the item is no more described in the following drawings.

Figure 1:
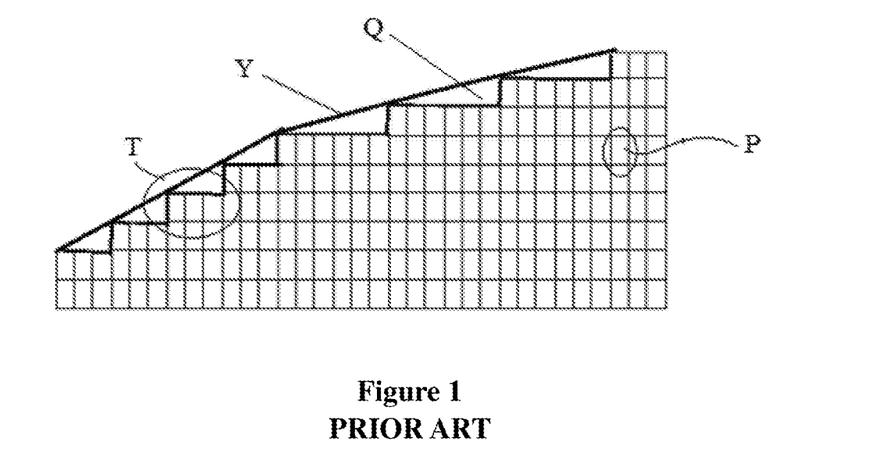
FIG. 1 is a schematic diagram showing a number of pixels in an irregular display panel in related technology.

FIG. 1 is a schematic diagram showing a number of pixels in an irregular display panel in related technology. As shown in FIG. 1, in order to match with an irregular boundary Y of the irregular display panel, some pixels P are removed at positions near the irregular boundary Y, and multiple step regions T are formed in the display region near the irregular boundary Y. A region Q between the irregular boundary Y and the step region T cannot be provided with a complete pixel, and is blocked with a black matrix (BM). In displaying, the pixel P in the step region T is lighted normally, and the black matrix in the region Q is almost opaque and has luminance of zero. A serrated edge is formed due to the large luminance difference between the step region T and the region Q. Therefore, a pattern at the irregular boundary Y is unsmooth, which affects a display effect of the display panel. For example, in a case that a part of the display region of the display panel is removed to arrange a camera or an earpiece, and the removed part is in a chamfered rectangle shape, a circular shape, an oval shape or other shapes, the display region has an irregular boundary. For another example, in a case that the display panel is in a chamfered rectangle shape, a circular shape, a ring shape or other non-rectangle shapes, the serrated texture also occurs.

The irregular display panel in the present disclosure includes low-luminance pixels and normal pixels. The luminance of the low-luminance pixel is less than the luminance of the normal pixel by regulating the sum of lengths of slits of an electrode in each sub pixel of the low-luminance pixel close to the irregular boundary, which reduces a luminance difference between the step region and the region near the irregular boundary, and thus suppresses the serrated display in the display panel.

Figure 2:
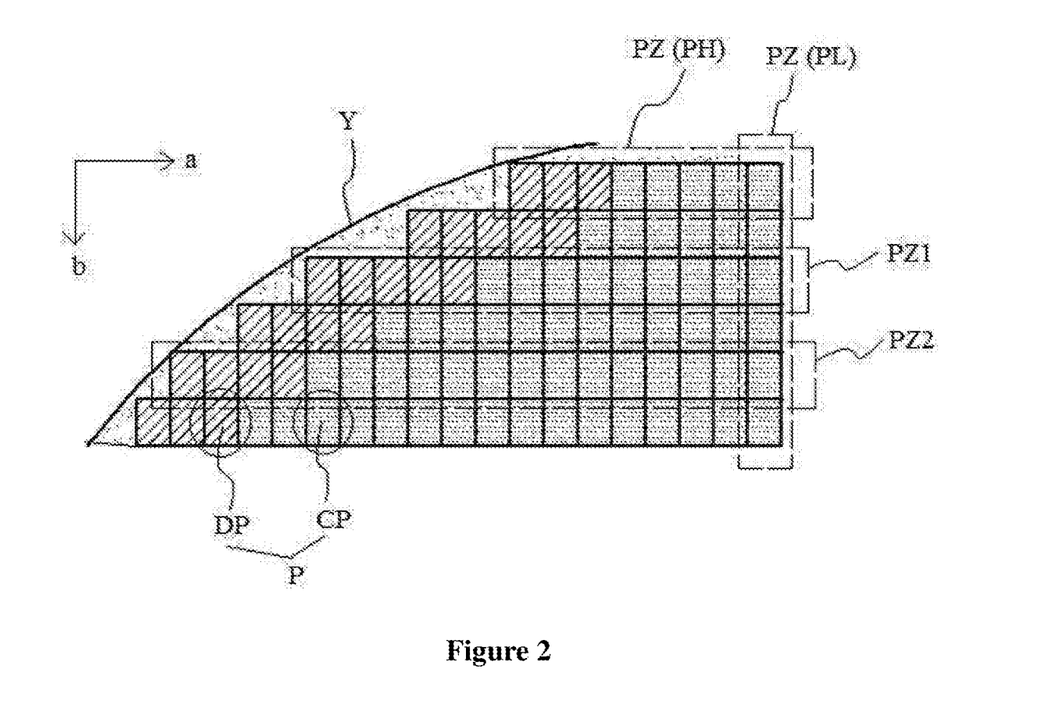
FIG. 2 is a top view of an irregular display panel according to an embodiment of the present disclosure.

FIG. 2 is a top view of an irregular display panel according to an embodiment of the present disclosure. As shown in FIG. 2, a display region of the irregular display panel has an irregular boundary Y, and the irregular display panel includes multiple pixels P. The multiple pixels P include low-luminance pixels DP and normal pixels CP. Luminance of the low-luminance pixels DP is less than luminance of the normal pixels CP under the same driving voltage. Multiple pixel rows PH extending in a first direction a and multiple pixel columns PL extending in a second direction b are formed by the multiple pixels P. The first direction a intersects with the second direction b. The pixel rows PH and/or the pixel columns PL include pixel groups PZ. Each pixel group PZ, as a part of the pixel row PH or the pixel column PL, includes one or more of the low-luminance pixels DP at an end of the pixel group PZ and one or more of the normal pixels CP at the other end of the pixel group PZ. The normal pixels CP are arranged away from the irregular boundary Y. The number of pixels in the pixel group PZ is not limited in the present disclosure. The normal pixels CP are arranged away from the irregular boundary Y as compared with the low-luminance pixels DP. A region between the irregular boundary Y and the low-luminance pixel DP is opaque and has luminance of almost zero in displaying. Luminance of the low-luminance pixels DP is lower than luminance of the normal pixels CP. As compared with the conventional display panel, a luminance difference between a display region close to the irregular boundary Y and a region adjacent to the irregular boundary Y is reduced, thereby suppressing serrated display at the irregular boundary. In order to ensure gradual and smooth transition of luminance, in a pixel group PZ including the low-luminance pixels DP, the number of low-luminance pixels DP may be greater than the number of pixels adjacent to the irregular boundary Y, that is, there is a low-luminance pixel DP which is not adjacent to the irregular boundary Y in the display panel.

As shown in FIG. 2, the pixel group PZ includes a first pixel group PZ1 and a second pixel group PZ2. The number of pixels P in the first pixel group PZ1 which are adjacent to the irregular boundary Y is greater than the number of pixels P in the second pixel group PZ2 which are adjacent to the irregular boundary Y. The number of low-luminance pixels DP in the first pixel group PZ1 is greater than or equal to the number of low-luminance pixels DP in the second pixel group PZ2. In the present disclosure, the number of low-luminance pixels DP in a pixel group PZ increases with an increase in the number of pixels P adjacent to the irregular boundary Y in the pixel group PZ. In an embodiment, the number of low-luminance pixels DP in the pixel group is greater than or equal to the number of pixels P adjacent to the irregular boundary Y in the pixel group. Therefore, a boundary shape displayed in the display region close to the irregular boundary Y is more similar to a shape of the irregular boundary Y, thereby suppressing the serrated display at the boundary.

Figure 3:
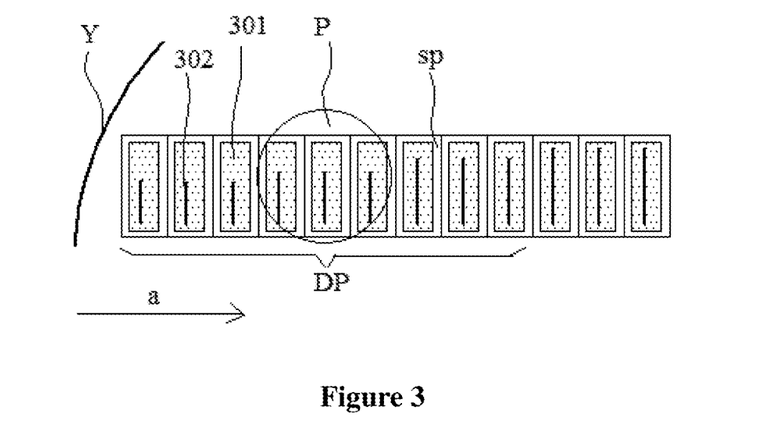
FIG. 3 is a top view of a pixel group in an irregular display panel according to an embodiment of the present disclosure.

In the present disclosure, the pixel P includes at least three sub pixels, and each sub pixel includes an electrode. The electrode may be a pixel electrode or a common electrode. The sub pixels in the same pixel have the same type of electrode. The electrode includes at least one slit. Defining a total slit length of a pixel as a sum of lengths of all the slits of all sub pixels in the pixel, the total slit lengths of the low-luminance pixels in the same pixel group increases gradually in a direction from the irregular boundary to the display region. FIG. 3 shows a pixel group in an irregular display panel according to an embodiment of the present disclosure. FIG. 3 shows an example that a pixel group is formed by a pixel row. The pixel P includes three sub pixels sp. An electrode 301 in the sub pixel sp includes a slit 302. In a first direction a from the irregular boundary Y to the display region, the total slit lengths of the low-luminance pixels DP increase gradually, and electric field intensities of the electrodes in the low-luminance pixels DP at a same voltage increase gradually. As a result, luminance of the low-luminance pixels DP increases gradually in the direction a from the irregular boundary to the display region, so that the luminance transits gradually from small to normal in the direction from the irregular boundary to the display region, and no significant luminance difference occurs in the display region.

The irregular display panel in the present disclosure includes the low-luminance pixels and the normal pixels. Luminance of the low-luminance pixels is less than luminance of the normal pixels. The low-luminance pixels are arranged in the display region close to the irregular boundary, so as to suppress the serrated display at the irregular boundary. Also, the luminance of the low-luminance pixels increases gradually in the direction from the irregular boundary to the display region, so that the luminance transits gradually from small to normal in the direction from the irregular boundary to the display region, and no significant luminance difference occurs in the display region, thereby having a good display effect.

Figure 4:
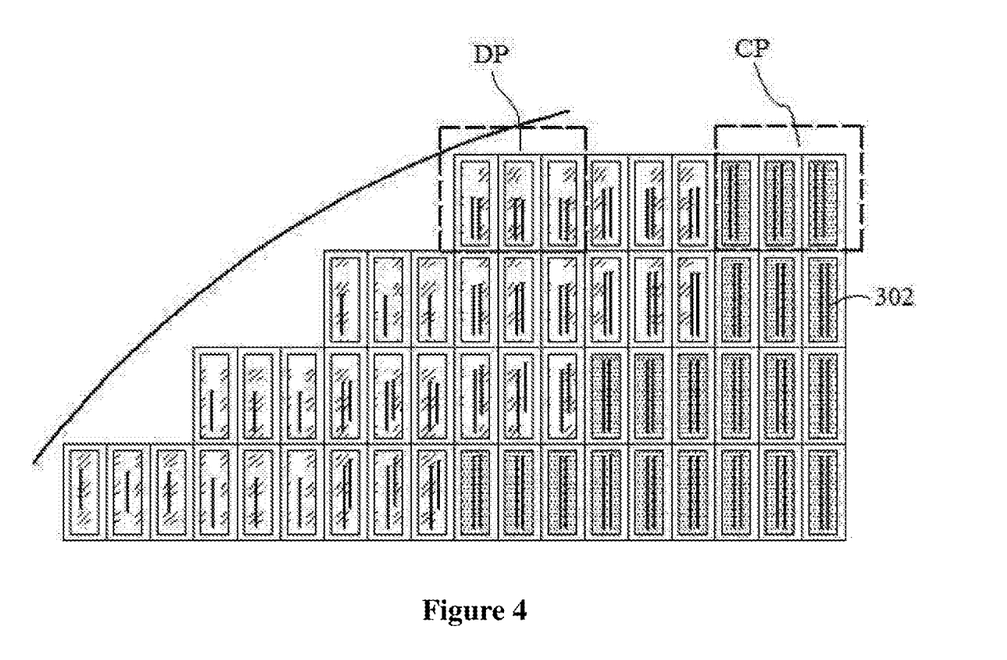
FIG. 4 is a top view of an irregular display panel according to an embodiment of the present disclosure.

Furthermore, FIG. 4 is a top view of an irregular display panel according to an embodiment of the present disclosure. As shown in FIG. 4, the slits 302 in the normal pixels CP are of the same length, and the length of each slit 302 of the low-luminance pixels DP is greater than or equal to zero and less than or equal to the length of the slit 302 of the normal pixels CP.

The electrode of the sub pixel in the present disclosure may include two or more slits. The slits in the sub pixels of the normal pixels are of the same length, and the slits in the sub pixels of the low-luminance pixels may have different lengths. The length of each slit in the low-luminance pixel is greater than or equal to zero and less than or equal to the length of the slit in the normal pixels, so as to meet a requirement for different luminance of the low-luminance pixels.

Furthermore, in the irregular display panel according to some embodiments of the present disclosure, the number of slits in each sub pixel of each low-luminance pixel is greater than or equal to one and less than or equal to five. In the embodiment, the number of slits in the sub pixels is designed based on the size of the sub pixel and requirements for different luminance of the low-luminance pixels in different regions close to the irregular boundary, so as to suppress the serrated display at the irregular boundary.

Furthermore, in some embodiments, the sum of lengths of all slits in each sub pixel of each normal pixel is 5 L. The length of each slit in the normal pixel is L, and L is a positive number. The sum of lengths of all slits in each sub pixel of each low-luminance pixel is greater than or equal to 0.5 L and less than 5 L. In the embodiment, in a case that the sum of lengths of all slits in all sub pixels of a pixel is 5 L, the pixel has highest luminance. In a case that the sum of lengths of all slits in all sub pixel of a pixel is 0.5 L, the pixel has lowest luminance By designing that the sum of lengths of all slits in the sub pixel of the low-luminance pixel is greater than 0.5 L and less than 5 L, luminance of the low-luminance pixels transits gradually from the lowest luminance to the highest luminance, so as to meet requirements for different luminance of the low-luminance pixels in different regions close to the irregular boundary.

Figure 5:
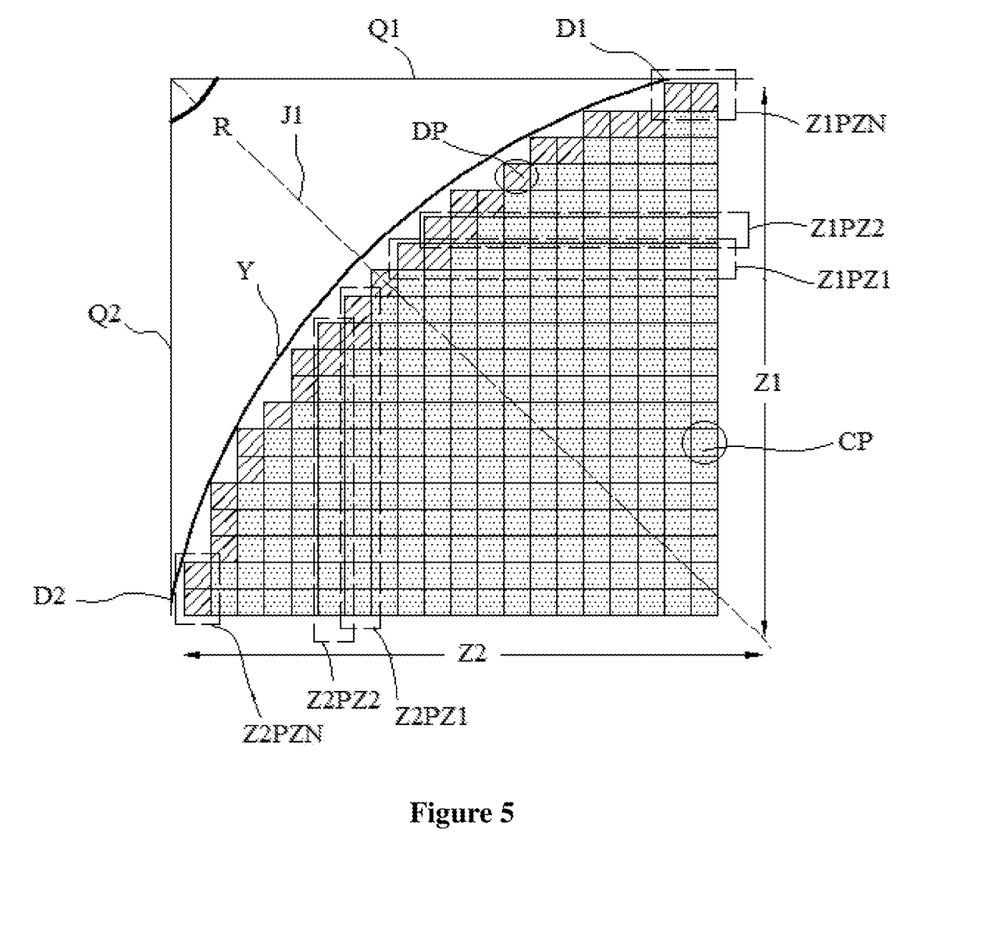
FIG. 5 is a top view of another irregular display panel according to an embodiment of the present disclosure.

FIG. 5 is a top view of another optional implementation of an irregular display panel according to an embodiment of the present disclosure. As shown in FIG. 5, the irregular display panel includes low-luminance pixels DP and normal pixels CP. The irregular boundary Y is an arc-shaped boundary. A first tangent line Q1 and a second tangent line Q2 of the arc-shaped boundary intersect with each other to form an angle R toward the arc-shaped boundary. The first tangent line Q1 passes through a first endpoint D1 of the arc-shaped boundary, and the second tangent line Q2 passes through a second endpoint D2 of the arc-shaped boundary. A display region between an angular bisector J1 of the angle R and the first tangent line Q1 is a first region Z1, and a display region between the angular bisector J1 of the angle R and the second tangent line Q2 is a second region Z2. In the first region Z1, the pixel groups are formed in the pixel rows PH. In the second region Z2, the pixel groups are formed in the pixel columns. The first region Z1 includes a first pixel group Z1PZ1 of the first region, a second pixel group Z1PZ2 of the first region, . . . , and an N-th pixel group Z1PZN of the first region arranged sequentially in a direction from the angular bisector J1 of the angle R to the first tangent line Q1. The second region Z2 includes a first pixel group Z2PZ1 of the second region, a second pixel group Z2PZ2 of the second region, . . . , and an N-th pixel group Z2PZN of the second region arranged sequentially in a direction from the angular bisector J1 of the angle R to the second tangent line Q2. The low-luminance pixels of an X-th pixel group in the first region are in one-to-one correspondence with the low-luminance pixel of an X-th pixel group in the second region in the direction from the irregular boundary to the display region, and the total slit lengths of the low-luminance pixels of the X-th pixel group in the first region are respectively equal to the total slit lengths of the corresponding low-luminance pixels of the X-th pixel group in the second region. X is greater than or equal to one and less than or equal to N, and N is a positive integer. FIG. 5 only shows the arrangement of the pixels in the irregular display panel, without showing the sub pixels in the pixels P.

In the embodiment, the irregular boundary of the irregular display panel is an arc-shaped boundary, and the display region close to the irregular boundary is divided into the sub-regions. In the direction from the irregular boundary to the display region, the total slit lengths of the pixels of the X-th pixel group in the first region are respectively equal to the total slit lengths of the corresponding pixels of the X-th pixel group in the second region, that is, luminance of the pixels of the X-th pixel group in the first region are the same as luminance of the corresponding pixels in the X-th pixel group in the second region. Therefore, in the display region close to the irregular boundary, a shape of a displayed boundary pattern is more similar to a shape of the arc-shaped boundary, suppressing the serrated display at the irregular boundary. Furthermore, the luminance of pixels in the two regions divided by the angular bisector of the angle R transits in the same gradation, thereby having a good visual effect of the display panel.

Figure 6:
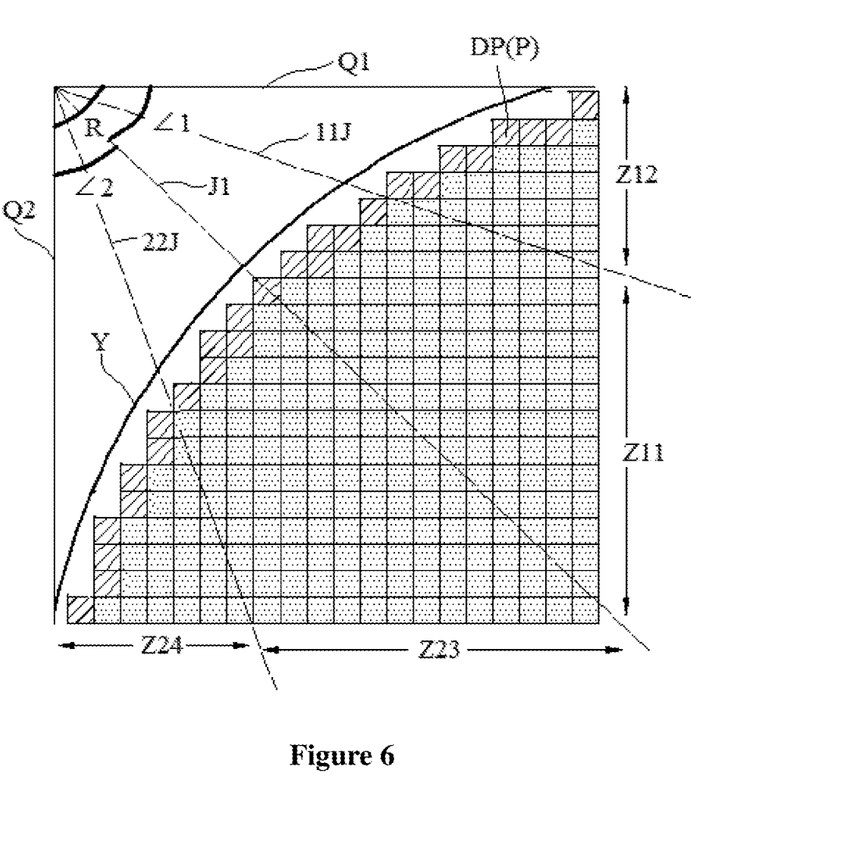
FIG. 6 is a top view of another irregular display panel according to an embodiment of the present disclosure.

Furthermore, FIG. 6 is a top view of another optional implementation of an irregular display panel according to an embodiment of the present disclosure. As shown in FIG. 6, the angle R is divided into a first angle ∠1 with the first tangent line Q1 and a second angle ∠2 with the second tangent line Q2, by the angular bisector of the angle R. The first region is divided into a first sub region Z11 near the angular bisector J1 of the angle R and a second sub region Z12 near the first tangent line Q1, by an angular bisector 11J of the first angle ∠1. The number of pixels P adjacent to the irregular boundary Y in the pixel groups in the second sub region Z12 is greater than or equal to the number of pixels P adjacent to the irregular boundary Y in the pixel groups in the first sub region Z11. The second region is divided into a third sub region Z23 near the angular bisector J1 of the angle R and a fourth sub region Z24 near the second tangent line Q2, by an angular bisector 22J of the second angle ∠2. The number of pixels P adjacent to the irregular boundary Y in the pixel groups in the fourth sub region Z24 is greater than or equal to the number of pixels P adjacent to the irregular boundary Y in the pixel groups in the third sub region Z23.

In the embodiment, in the first sub region Z11 and the third sub region Z23 near the angular bisector J1 of the angle R, the irregular boundary is markedly curved, and the number of pixels P adjacent to the irregular boundary Y in the pixel groups is designed to be small, so that luminance at the irregular boundary varies smoothly. In this way, a serrated display at the irregular boundary is suppressed, and a displayed boundary shape is more similar to the arc. The second sub region Z12 and the fourth sub region Z24 are respectively near the two endpoints of the irregular boundary. Since the two endpoints of the irregular boundary also connect the regular boundary of the display panel, the curves of the irregular boundary in the second sub region Z12 and the fourth sub region Z24 are less apparent in visual than those in the first sub region Z11 and the third sub region Z23, so that in the second sub region Z12 and the fourth sub region Z24, more pixels can be arranged to be adjacent to the irregular boundary.

Furthermore, in some embodiments, as shown in FIG. 6, the number of pixels P adjacent to the irregular boundary Y in each pixel group in the first sub region Z11 is less than or equal to two, and the number of low-luminance pixels DP in each pixel group in the first sub region Z11 is less than or equal to two. The number of pixels P adjacent to the irregular boundary Y in each pixel group in the second sub region Z12 is greater than or equal to two, and the number of low-luminance pixels DP in each pixel group in the second sub region Z12 is greater than or equal to two.

In the embodiment, in a pixel group including a low-luminance pixel, the number of low-luminance pixels is greater than or equal to the number of pixels adjacent to the irregular boundary, which reduces luminance difference between the display region and the irregular boundary, and suppresses the serrated display.

Furthermore, in some embodiments, as shown in FIG. 6, in each pixels group in the second sub region Z12, the number of pixels P adjacent to the irregular boundary Y is the same as the number of low-luminance pixels DP. Since the number of pixels adjacent to the irregular boundary in the pixel group in the second sub region is large, all the pixels adjacent to the irregular boundary are set to be the low-luminance pixels, so as to suppress the serrated display. Also, luminance of the low-luminance pixels increases gradually in the direction from the irregular boundary to the display region, leading to uniform transition of the luminance and a good display effect of the display panel.

Furthermore, in some embodiments, a gray scale difference between low-luminance pixels with different luminance in the irregular display panel in the present disclosure is an integral multiple of 16.

In displaying, the luminance of the display panel changes among 256 luminance levels including a lowest luminance level 0 to a highest luminance level 255, which are also referred to as 256 gray scales. In the embodiment, fourteen types of low-luminance pixels with gray scale differences of an integral multiple of 16 are designed in advance by changing the length of the slit and/or the number of slits in the electrode of the pixel. The pixel with lowest luminance in the low-luminance pixels has a gray level 15, and the pixel with the highest luminance in the low-luminance pixels has a gray level 239. The low-luminance pixels to be arranged at positions adjacent to the irregular boundary are selected based on a luminance requirement. Since the length of the slit in the electrode is already designed, the design time is saved. It is required to design six types of low-luminance pixels if a gray scale difference is equal to an integral multiple of 32. In this case, the number of low-luminance pixels with different luminance is too small, which cannot meet the requirement for different luminance of pixels adjacent to the irregular boundary. It is required to design thirty types of low-luminance pixels if the gray scale difference is an integral multiple of 8. In this case, the number of low-luminance pixels with different luminance is large, which results in a complex design. Fourteen types of low-luminance pixels with different luminance are designed in the embodiment, which is simple in design while achieving a variety of luminance change of the low-luminance pixels.

It should be noted that a gray scale difference between the low-luminance pixels with different luminance in the irregular display panel can be designed based on the requirement for different luminance. The above embodiment, in which the gray scale difference between the low-luminance pixels with different luminance is an integral multiple of 16, is only optional and is not intended to be limit.

Figure 7:
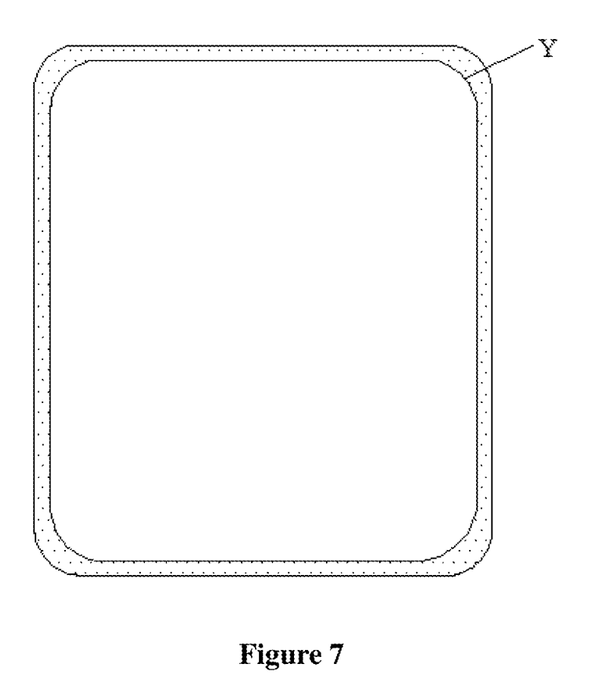
FIG. 7 is a top view of a display device according to an embodiment of the present disclosure.

Furthermore, a display device is provided in the present disclosure, which includes any irregular display panel according to the above embodiments of the present disclosure. FIG. 7 is a top view of an optional implementation of a display device according to an embodiment of the present disclosure. As shown in FIG. 7, the display device includes an irregular display panel having an arc-shaped boundary Y. In the display device in the present disclosure, the irregular display panel includes low-luminance pixels and normal pixels. The low-luminance pixels are arranged in a display region close to the irregular boundary. By regulating the sum of lengths of slits of electrodes in sub pixels, electric field intensities of the electrodes in the sub pixels are different after the same voltage is applied, thereby obtaining different transmittance of the pixels. Luminance of the low-luminance pixels is less than luminance of the normal pixels, so as to suppress the serrated display at the irregular boundary. The luminance of the low-luminance pixels increases gradually in a direction from the irregular boundary to the display region, so that the luminance transits gradually from small to normal in the direction from the irregular boundary to the display region.

It can be known from the above embodiments that the irregular display panel and the display device in the present disclosure can realize the following advantageous effects.

The irregular display panel in the present disclosure includes low-luminance pixels and normal pixels, and the low-luminance pixels are arranged in a display region close to the irregular boundary. By regulating the sum of lengths of slits of electrodes in sub pixels, electric field intensities of the electrodes in the sub pixels are different after the same voltage is applied, thereby obtaining different transmittance of the pixels. Luminance of the low-luminance pixels is less than luminance of the normal pixels, so as to suppress the serrated display at the irregular boundary. The luminance of the low-luminance pixels increases gradually in a direction from the irregular boundary to the display region, so that the luminance transits gradually from small to normal in the direction from the irregular boundary to the display region, and no large luminance difference occurs in the display region, realizing a good display effect.

Although some specific embodiments of the present disclosure are described in detail through examples, it should be understood by those skilled in the art that the above examples are used for illustration, rather than for limiting the scope of the present disclosure. It should be understood by those skilled in the art that modification can be made to the above embodiments without departing from the scope and spirit of the present disclosure. The scope of present disclosure is defined by the accompanying claims.

The invention claimed is:
1. An irregular display panel, comprising:
    a display region having an irregular boundary; and
    a plurality of pixels;
    wherein the plurality of pixels comprises low-luminance pixels and normal pixels, and luminance of the low- luminance pixels is less than luminance of the normal pixels under a same driving voltage;

wherein a plurality of pixel rows extending in a first direction and a plurality of pixel columns extending in a second direction are formed by the plurality of pixels, the pixel rows and/or the pixel columns comprise pixel groups, each of the pixel groups comprises one or more of the low-luminance pixels at an end of the pixel group and one or more of the normal pixels at the other end of the pixel group, the normal pixels are arranged away from the irregular boundary, and the first direction intersects with the second direction;

wherein each of the plurality of pixels comprises at least three sub pixels, each of the sub pixels comprises an electrode, and the electrode comprises at least one slit;

wherein a total slit length of each of the plurality of pixels is a sum of lengths of all the slits of the at least three sub pixels in the pixel, and the total slit lengths of the low-luminance pixels in a same pixel group increase gradually in a direction from the irregular boundary to the display region;

wherein the irregular boundary is an arc-shaped boundary with two end points;

wherein a first tangent line at a first end point of the arc-shaped boundary intersects with a second tangent line at a second end point of the arc-shaped boundary to form an angle R;

wherein the display region between an angular bisector of the angle R and the first tangent line is a first region, and the display region between the angular bisector of the angle R and the second tangent line is a second region, wherein the pixel groups are formed in the pixel rows in the first region, and the pixel groups are formed in the pixel columns in the second region;

wherein the first region comprises a first pixel group of the first region to an N-th pixel group of the first region arranged sequentially in a direction from the angular bisector of the angle R to the first tangent line, and the second region comprises a first pixel group of the second region to an N-th pixel group of the second region arranged sequentially in a direction from the angular bisector of the angle R to the second tangent line; and wherein the low-luminance pixels of an X-th pixel group in the first region are in one-to-one correspondence with the low-luminance pixels of an X-th pixel group in the second region in the direction from the irregular boundary to the display region, and the total slit lengths of the low-luminance pixels of the X-th pixel group in the first region are respectively equal to the total slit lengths of the corresponding low-luminance pixels of the X-th pixel group in the second region, wherein X is greater than or equal to one and less than or equal to N, and N is a positive integer.

2. The irregular display panel according to claim 1, wherein length of each slit in each of the normal pixels is the same, and length of each slit in each of the low-luminance pixels is greater than or equal to zero and less than or equal to the length of the slit in each of the normal pixels.

3. The irregular display panel according to claim 2, wherein the number of the slit in each of the sub pixels of each of the low-luminance pixels ranges from one to five.

4. The irregular display panel according to claim 3, wherein
the sum of lengths of all the slits in each of the sub pixels of each of the normal pixels is 5L, and length of each slit in each normal pixel is L, and L is a positive number; and
a sum of lengths of all the slits in each of the sub pixels of each of the low-luminance pixels is greater than or equal to 0.5L and less than 5L.

5. The irregular display panel according to claim 1, wherein
the angle R is divided by the angular bisector of the angle R into a first angle with the first tangent line and a second angle with the second tangent line;
the first region is divided into a first sub region near the angular bisector of the angle R and a second sub region near the first tangent line by an angular bisector of the first angle, and the number of pixels adjacent to the irregular boundary in the pixel groups in the second sub region is greater than or equal to the number of pixels adjacent to the irregular boundary in the pixel groups in the first sub region; and
the second region is divided into a third sub region near the angular bisector of the angle R and a fourth sub region near the second tangent line by an angular bisector of the second angle, and the number of pixels adjacent to the irregular boundary in the pixel groups in the fourth sub region is greater than or equal to the number of pixels adjacent to the irregular boundary in the pixel group in the third sub region.

6. The irregular display panel according to claim 5, wherein
the number of pixels adjacent to the irregular boundary in each of the pixel groups in the first sub region is less than or equal to two, and the number of low-luminance pixels in each of the pixel groups in the first sub region is less than or equal to two; and
the number of pixels adjacent to the irregular boundary in each of the pixel groups in the second sub region is greater than or equal to two, and the number of low-luminance pixels in each of the pixel groups in the second sub region is greater than or equal to two.

7. The irregular display panel according to claim 6, wherein in each of the pixel groups in the second sub region, the number of pixels adjacent to the irregular boundary is equal to the number of low-luminance pixels.

8. The irregular display panel according to claim 1, wherein a gray scale difference between the low-luminance pixels with different luminance is an integral multiple of sixteen.

9. The irregular display panel according to claim 1, wherein the pixel groups comprise a first pixel group and a second pixel group, the number of pixels in the first pixel group which are adjacent to the irregular boundary is greater than the number of pixels in the second pixel group which are adjacent to the irregular boundary, and the number of low-luminance pixels in the first pixel group is greater than or equal to the number of low-luminance pixels in the second pixel group.

10. A display device, comprising an irregular display panel, wherein the irregular display panel comprises:
a display region having an irregular boundary; and
a plurality of pixels;
wherein the plurality of pixels comprises low-luminance pixels and normal pixels, and luminance of the low-luminance pixels is less than luminance of the normal pixels under a same driving voltage;

wherein a plurality of pixel rows extending in a first direction and a plurality of pixel columns extending in a second direction are formed by the plurality of pixels, the pixel rows and/or the pixel columns comprise pixel groups, each of the pixel groups comprises one or more of the low-luminance pixels at an end of the pixel group and one or more of the normal pixels at the other end of the pixel group, the normal pixels are arranged away from the irregular boundary, and the first direction intersects with the second direction;

wherein each of the plurality of pixels comprises at least three sub pixels, each of the sub pixels comprises an electrode, and the electrode comprises at least one slit;

wherein a total slit length of each of the plurality of pixels is a sum of lengths of all the slits of the at least three sub pixels in the pixel, and the total slit lengths of the low-luminance pixels in a same pixel group increase gradually in a direction from the irregular boundary to the display region;

wherein the irregular boundary is an arc-shaped boundary with two end points;

wherein a first tangent line at a first end point of the arc-shaped boundary intersects with a second tangent line at a second end point of the arc-shaped boundary to form an angle R;

wherein the display region between an angular bisector of the angle R and the first tangent line is a first region, and the display region between the angular bisector of the angle R and the second tangent line is a second region, wherein the pixel groups are formed in the pixel rows in the first region, and the pixel groups are formed in the pixel columns in the second region;

wherein the first region comprises a first pixel group of the first region to an N-th pixel group of the first region arranged sequentially in a direction from the angular bisector of the angle R to the first tangent line, and the second region comprises a first pixel group of the second region to an N-th pixel group of the second region arranged sequentially in a direction from the angular bisector of the angle R to the second tangent line; and wherein the low-luminance pixels of an X-th pixel group in the first region are in one-to-one correspondence with the low-luminance pixels of an X-th pixel group in the second region in the direction from the irregular boundary to the display region, and the total slit lengths of the low-luminance pixels of the X-th pixel group in the first region are respectively equal to the total slit lengths of the corresponding low-luminance pixels of the X-th pixel group in the second region, wherein X is greater than or equal to one and less than or equal to N, and N is a positive integer.

11. The display device according to claim 10, wherein length of each slit in each of the normal pixels is the same, and length of each slit in each of the low-luminance pixels is greater than or equal to zero and less than or equal to the length of the slit in each of the normal pixels.

12. The display device according to claim 10, wherein
the angle R is divided by the angular bisector of the angle R into a first angle with the first tangent line and a second angle with the second tangent line;
the first region is divided into a first sub region near the angular bisector of the angle R and a second sub region near the first tangent line by an angular bisector of the first angle, and the number of pixels adjacent to the irregular boundary in the pixel groups in the second sub region is greater than or equal to the number of pixels adjacent to the irregular boundary in the pixel groups in the first sub region; and
the second region is divided into a third sub region near the angular bisector of the angle R and a fourth sub region near the second tangent line by an angular bisector of the second angle, and the number of pixels adjacent to the irregular boundary in the pixel groups in the fourth sub region is greater than or equal to the number of pixels adjacent to the irregular boundary in the pixel group in the third sub region.

13. The display device according to claim 12, wherein
the number of pixels adjacent to the irregular boundary in each of the pixel groups in the first sub region is less than or equal to two, and the number of low-luminance pixels in each of the pixel groups in the first sub region is less than or equal to two; and
the number of pixels adjacent to the irregular boundary in each of the pixel groups in the second sub region is greater than or equal to two, and the number of low-luminance pixels in each of the pixel groups in the second sub region is greater than or equal to two.

14. The display device according to claim 13, wherein in each of the pixel groups in the second sub region, the number of pixels adjacent to the irregular boundary is equal to the number of low-luminance pixels.

15. The display device according to claim 10, wherein a gray scale difference between the low-luminance pixels with different luminance is an integral multiple of sixteen.

16. The display device according to claim 10, wherein the pixel groups comprise a first pixel group and a second pixel group, the number of pixels in the first pixel group which are adjacent to the irregular boundary is greater than the number of pixels in the second pixel group which are adjacent to the irregular boundary, and the number of low-luminance pixels in the first pixel group is greater than or equal to the number of low-luminance pixels in the second pixel group.

* * * * *